(12) United States Patent
Teets

(10) Patent No.: US 8,671,685 B2
(45) Date of Patent: Mar. 18, 2014

(54) MICROTURBINE SUN TRACKER

(75) Inventor: Joseph Michael Teets, Hobe Sound, FL (US)

(73) Assignee: TMA Power, LLC, Hobe Sound, FL (US)

( * ) Notice: Subject to any disclaimer, the term of this patent is extended or adjusted under 35 U.S.C. 154(b) by 263 days.

(21) Appl. No.: 12/932,627

(22) Filed: Mar. 2, 2011

(65) Prior Publication Data

US 2011/0214406 A1 Sep. 8, 2011

Related U.S. Application Data

(60) Provisional application No. 61/339,665, filed on Mar. 8, 2010.

(51) Int. Cl.
| | | |
|---|---|---|
| *B60K 16/00* | (2006.01) | |
| *B60L 8/00* | (2006.01) | |
| *F03G 6/00* | (2006.01) | |
| *F03G 7/00* | (2006.01) | |

(52) U.S. Cl.
USPC .................. 60/641.8; 60/641.11; 60/641.15

(58) Field of Classification Search
USPC ............... 60/641.1, 641.8, 641.15; 126/600
See application file for complete search history.

(56) References Cited

U.S. PATENT DOCUMENTS

| | | | |
|---|---|---|---|
| 4,121,564 A | 10/1978 | Schwartz | |
| 4,236,383 A | 12/1980 | Selcuk | |
| 4,642,988 A | 2/1987 | Benson | |
| 5,611,201 A | 3/1997 | Houtman | |
| 5,735,123 A | 4/1998 | Ehrig | |
| 6,487,859 B2 | 12/2002 | Mehos | |
| 6,668,555 B1 | 12/2003 | Moriarity | |
| 6,688,303 B2 | 2/2004 | Davenport et al. | |
| 6,953,038 B1 | 10/2005 | Nohrig | |
| 6,979,911 B2 | 12/2005 | Otting | |
| 7,026,722 B1 | 4/2006 | Otting et al. | |
| 7,051,529 B2 * | 5/2006 | Murphy et al. | ............. 60/641.8 |
| 7,084,518 B2 * | 8/2006 | Otting et al. | ................. 290/1 R |
| 7,185,493 B1 | 3/2007 | Connelly | |
| 7,211,906 B2 * | 5/2007 | Teets et al. | ...................... 290/52 |
| 7,299,633 B2 | 11/2007 | Murphy | |
| 2009/0194145 A1 * | 8/2009 | Kribus et al. | ................. 136/248 |

OTHER PUBLICATIONS

Teets, Jon W. A Rankine—Microturbine Power Plant for Generating Electrcity. Draft Engineering Report ER032. Abstract and Fig. 7. Oct. 2007.*
E Koda, "Study on the high efficiency close cycle gas turbine system." Proc. of ASME Turbo Expo 2001, 2001, 2001-GT-0562.
Harrah, W. G., and Caldwell, R. T.: System Optimization of Brayton-Cycle Space Power Plants. Paper 63-WA-87, ASME, 1963.

* cited by examiner

*Primary Examiner* — Thomas E. Denion
*Assistant Examiner* — Brian Inacay

(57) ABSTRACT

The invention relates electrical power generation using renewable sun energy in a Microturbine Sun Tracker (MST), a system for useful electrical output power that combines a Concentrated Solar Energy (CSE) with a closed cycle Microturbine powerplant.

The solar light ray energy of the CSE is directed into a solar receiver with an integrated closed cycle microturbine powerplant, heating the working fluid of the microturbine to cause the turbine rotor/power spool rotation and subsequent output electricity. Also the (MST) system combines the dish form (CSE) and the closed cycle microturbine powerplant to a common frame that incorporates a single axis 360° rotation capability and secondary declination tilting capability.

7 Claims, 10 Drawing Sheets

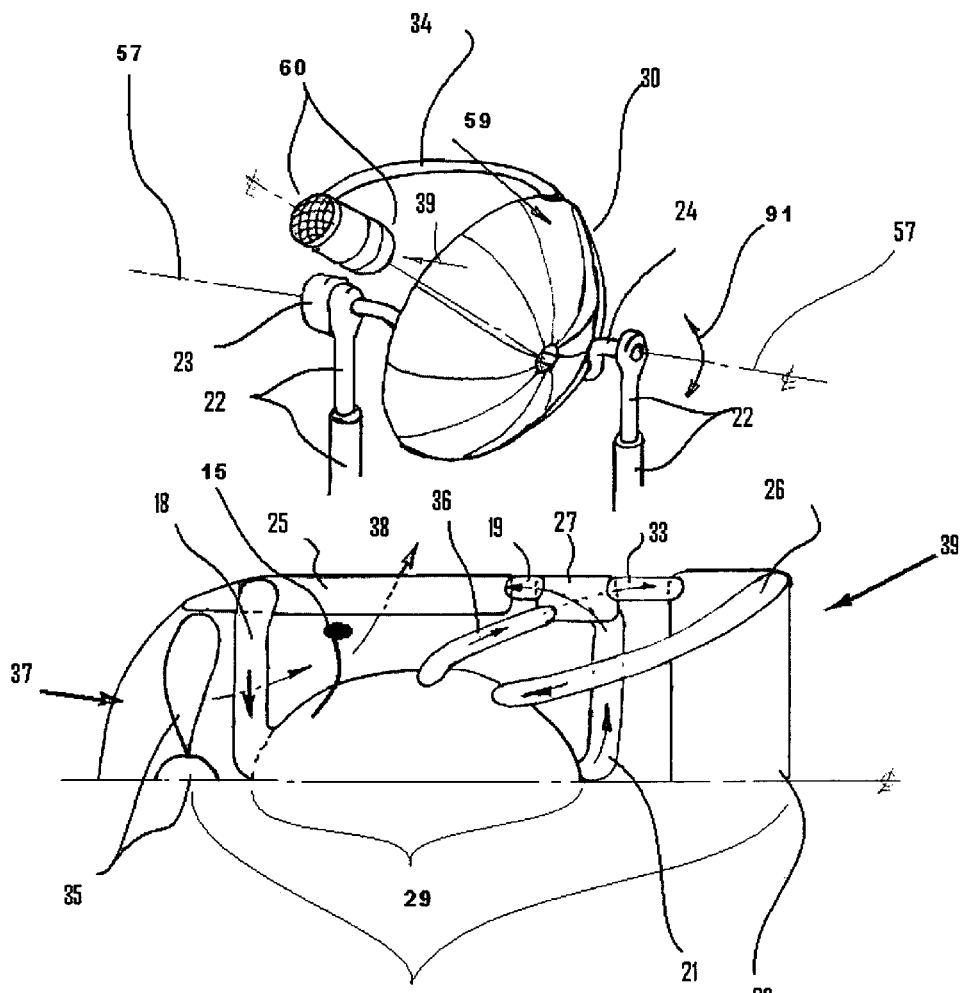

MICROTURBINE SUN TRACKER

This application claims benefit of the provisional application Ser. No. 61/339,665 filed Mar. 8, 2010.

BACKGROUND OF THE INVENTION

1. Field of the Invention

The present invention relates generally to a solar dish engine and more specifically relates to the Microturbine Sun Tracker (MST) for electrical output power generation from a combined Concentrated solar Energy (CSE) and a closed cycle Microturbine system where solar energy heats the working fluid of the microturbine and this resultant heated gas energy is directed to the microturbine-turbine rotor causing the rotor spool rotation and resultant output electricity.

2. Description of Prior Art

It can be appreciated that solar dish engines have been in use for years. Typically, a solar dish engine has comprised of an microturbine with an open cycle having Power Electronics that receives the high frequency, high AC output engine alternator voltage and converts it to DC volts then back to AC voltage and frequency for useful output customer power. Others include the engine Stirling driving a synchronous generator used to convert solar rays to useful electrical output power, the PV (photo voltaic) systems and parabolic troughs systems that concentrate solar rays onto a receiver tubes to heat fluids that in-turn drives a remote steam turbine connected electrical generator.

The main problem with conventional solar dish engines are: high initial purchase cost, the sterling engine has limits relative to orientation/positioning, requires simultaneous 2 axis steering system which lend to complexity, cost and maintenance. Another problem with conventional Stirling solar dish engine are the inherent large number of moving parts, seals, working gas leakage and flammable working cycle gas of the Sterling engine along with the structure to retain the high weight adds to maintenance cost. Another problem with conventional solar dish engine are the Stirling engine integrated parabolic solar collector although displays useful electrical power output as an alternative energy source, is predominately suited for ground and remote locations due to its weight, size and some cases flammable cycle working fluid.

While these devices may be suitable for the particular purpose to which they address, they are not as suitable for electrical output power generation from a present invention, combined Concentrated Solar Energy (CSE) and closed cycle microturbine system where solar energy heats the working fluid and the microturbine and this resultant heated gas energy is directed to the microturbine turbine rotor causing rotor spool rotation and resultant output electricity.

In these respects, the Microturbine Sun Tracker (MST) according to the present invention substantially departs from the conventional concepts and designs of the purpose of electrical output power generation from a combined Concentrated Solar Energy and a closed cycle microturbine system where solar energy heats the working fluid of the microturbine and rotor spool rotation and resultant output electricity.

SUMMARY OF THE INVENTION

In view of the foregoing disadvantages inherent in the known types of solar dish engines and PV system now present in the prior art, the present invention provides a Microturbine Sun Tracker construction wherein the same can be utilized for electrical output power generation from a combined Concentrated Solar Energy (CSE) and a closed cycle microturbine system where solar energy heats the working fluid of the microturbine and heated gas energy is directed to the microturbine turbine rotor causing rotor spool rotation and resultant output electricity.

The general purpose of the present invention, which will be described subsequently in greater detail, is to provide a closed cycle microturbine (Microturbine Sun Tracker) that has many of the advantages of the solar dish engine mentioned heretofore and many novel features that result in a new microturbine which is not anticipated, rendered obvious, suggested, or even implied by any of the prior art solar dish engines, either alone or in any combination thereof.

To attain this, the present invention as a system generally comprises a Solar Ray Concentrator, a Microturbine, a Solar Receiver, a Heat Exchanger, a Radiator, a Horizontal Frame, Declination Poles, Frame Rotator, Power Electronics and Electronic Control. An integrated dish form concentrating solar collector is mounted onto a frame having single axis rotation and secondary declination tilting, reflects the collected sun rays to the Solar Receiver. The Solar Receiver absorbs the concentrated sun ray solar heat energy reflected ray from the Solar Concentrator and transfers it to the microturbine engine having sealed cycle gas working fluid. The microturbine incorporates a closed Brayton cycle, and external heat source, a minimum of one rotatable rotor spool having a compressor rotor, turbine rotor, alternator rotor and a stator within an engine body. The Heat Exchanger takes turbine exhaust gas waste heat and preheats the compressor discharge gas before entering the Solar Receiver for further heating of the gas working fluid. Radiator cools the microturbine closed cycle working fluid prior to entering the compressor rotor inlet. The Horizontal Frame is capable of 360° rotation, retains the Solar Receiver, Microturbine, Radiator, Solar Concentrator, Heat Exchanger and has declination tilting capability. The Declination Poles are distal and proximal frame end mounted with swivel interface bearings and used for Earth Pole axis tilt/orient the horizontal frame. The Frame Rotator is a device that is directly or indirectly connected to a least one end of the Horizontal Frame to cause rotation of the frame for tracking the sun paralleling the earth's axis. The Electronic Control receives electronic and mechanical position indications from the solar engine, dish position sensors, controls engine speed, dish position, power output, engine starts and shut down. The Power Electronics converts high frequency high AC voltage from the engine alternator/stator to useful output volts and frequency; also directs voltage to the alternator for spool rotation engine start-up.

There has thus been outlined, rather broadly, the more important features of the invention in order that the detailed description thereof may be better understood, and in order that the present contribution to the art may be better appreciated.

There are additional features of the invention that will be described hereinafter. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a microturbine sun tracker that will overcome the shortcomings of the prior art devices. An object of the present invention is to provide a microturbine sun tracker for electrical output power generation from a combined CSE and a closed cycle microturbine system where solar energy heats the working fluid of the microturbine and this resultant heated gas energy is directed to the microturbine turbine rotor causing rotor spool rotation and resultant output electricity.

Another object is to provide a MST system that produces electrical output power to the customer and or owner through the use of a closed cycle microturbine integrated CSE system for on-site synchronous or non synchronous electrical power generation, grid or non grid application.

Another object is to provide a MST system that supplies electrical output power thru a CSE integrated closed cycle microturbine system with minimal to no maintenance over a minimum of 30 yr.

Another object is to provide a MST system that converts solar energy to electrical output power thru an integrated CSE—closed cycle microturbine system that is portable, does not require cooling fluids, capable of roof top deployment and is retractable for low profile adverse weather conditions and or cleaning cycle.

Another object is to provide a MTS that converts solar energy to electrical power thru a microturbine integrated CSE system having a sun tracking horizontal axis rotatable 360° capability and secondary earth polar axis (declination axis) adjustment can be simultaneous with the horizontal axis or periodic to a present position level.

Another object is to provide a MST system that offers a microturbine integrated CSE system for electrical output power in less weight and low profile capability allowing roof top mounted solar ray optimization thru a 2 point retentions means. Another object is to provide a MST that generates electrical power form an integrated CSE microturbine using a low pressure non flammable working fluid allowing safe residential applications in close proximity to the end user without transmission lines.

Another object is to provide a MST that generates electrical output power from a CSE—closed cycle microturbine system having one rotational engine part, hermitically sealed and no engine orientation issues.

Other object and advantages of the present invention will become obvious to the reader and it is intended that these object and advantages are within the scope of the present invention.

To the accomplishment of the above are related objects, this invention may be embodied in the form illustrated into the accompanying drawings, attention being called to the, however, that the drawings are illustrative only, and that changes may be made in the specific construction illustrated.

BRIEF DESCRIPTIONS OF THE DRAWINGS

Various other object, features and attendant advantages of the present invention will become full appreciated as the same becomes better understood when considered in conjunction with the accompanying drawings, in which like references characters designate the same or similar parts throughout the several views, and wherein:

FIG. 6 is an orthogonal view of a MST engine module single side supported.

FIG. 7 is a ¼ cross-sectional view of the MST dish engine module.

DESCRIPTION OF THE PREFERRED EMBODIMENT

Figure 1:
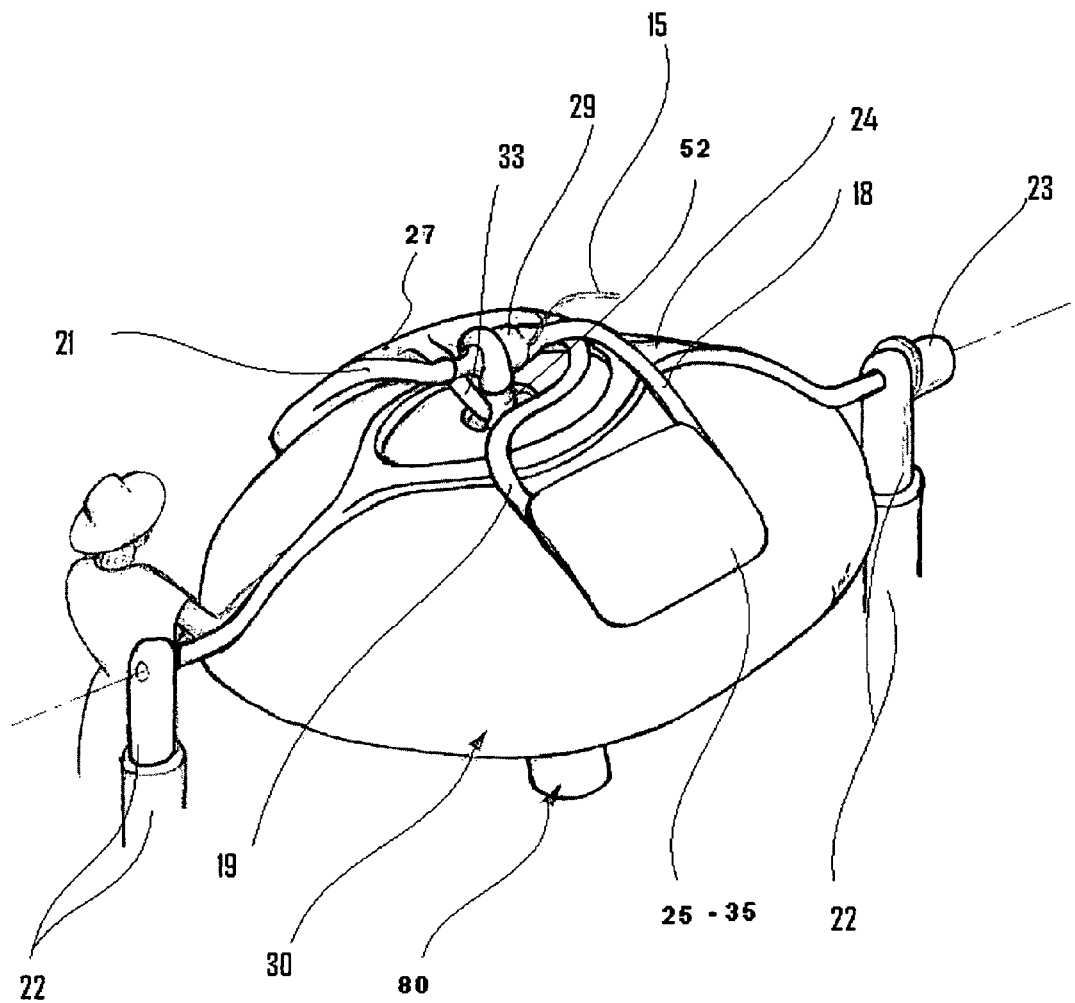
FIG. 1 is an orthogonal view of a stowed Microturbine Sun Tracker.

Turning now descriptively to the drawings, in which similar reference characters denote similar elements throughout the several views, the attached figures illustrate the MST, which comprises a Solar Ray Concentrator, a Microturbine, a Solar Receiver, a Heat Exchanger, a Radiator, a horizontal Frame, Declination Poles, Frame Rotator, Power Electronics and Electronic Control.

An integrated dish form concentrating solar collector (CSC) 30, is mounted onto a frame 24 having a single axis rotation 57 and a secondary declination tilting 91, reflects the collected sun rays 39 to the Solar Receiver 20. The Solar Receiver absorbs the concentrated sun ray solar heat energy 39 from the Solar Concentrator via heating the internal medium 90 and transferring the heat to the working fluid 36 of chamber 75 (closed cycle gas of the microturbine) as it thru the medium 90 exiting absorbing heat exiting heated 87 and into channel duct 26 and to the microturbine turbine 14 to drive the spool 70. The Microturbine engine module 29 incorporates a close Brayton cycle, an external heat source, a rotatable power spool 70 having a compressor rotor 48, rotor 14, alternator rotor 84 and stator 47 within an engine body 29. The Heat Exchanger 27 takes turbine exhaust gas waste heat and preheats the compressor discharge gas 48A as it leaves the stator 47 exiting duct 36. The Radiator 25 cools the Microturbine closed cycle gas (working fluid) prior to entering the compressor rotor inlet 18 duct delivery to compressor 48 inlet. The Horizontal Frame 24 is capable of 360° rotation, retains the Solar Receiver 20, Microturbine (module 29—engine body), Radiator 25-35, Solar Concentrator 30, Heat Exchanger 27 and has Declination Poles 22 (for earth pole axis adjusting). The Declination Poles are frame distal end mounted with swivel interface bearings. The Frame Rotator 23 is a device that is directly or indirectly connected to a least one end of the Horizontal frame 24 axis cause rotation of the frame for tracking the sun, paralleling the earth's axis. The Electronic Control 81 interfaces with the power electronic 31 and receives electronic and mechanical position signals from the solar engine (microturbine), dish position sensors, controls engine speed, dish position, power output, engine start and shut down.

The power Electronics 31 interconnected to the stator 41 exiting leads 15 having seal 53 to the ending body 29, and converts the high frequency high AC voltage to useful output volts and frequency; also directs external stored electrical energy (interconnected to the power electronics) to the stator for engine starting/spool rotation.

An integrated dish forms dish form concentrating solar collector 30 is mounted onto a frame 24 having single axis rotation and secondary declination tilting, reflects the collected sun rays to the Solar Receiver. The Solar Concentrator 3 FIG. 6, is a dish parabolic or hemispherical form reflective mirror, receives sun light ray energy 59 and concentrates-reflects-redirects 39 sun energy onto a Solar Receiver 20 having a common Frame 24 retained to. The solar concentrator, solar receiver and solar microturbine engine are mounted to a common Frame 24 having semi 2 axis steering capability to track the sun energy; the Solar Concentrator 3o is rotatable, horizontally to the earth's axis for sun tracking capability with outboard frame end retention bearing means end mounted to the declination poles 22, having a minimum of one frame declination pole connection to cause upwardly or downwardly frame tilting 91 thru adjustable 11 declination pole 22 a means for earth's polar axis tracking and can be simultaneous or periodic adjustable. The reflective element of the solar concentrator 30 can be multi-piece/segmented, metallic, glass or non metallic material coated or non coated with design consideration of reflectivity, size, durability, weight and cost. The useful engine temperature range of concentrated solar heat energy in the new Solar Engine invention ranges from ~600° F. to 1800°+use of high temperature materials and without any turbine cooling. Other forms of Solar Concentrators include remote solar engine on axis tracking capable-vertical mounted heliostats and parabolic troughs having integrated solar receivers. Also, the microturbine module 60 FIG. 6, 7 with the Solar Receiver 20 could be replaced by the solar engine body 50 FIG. 8 two spool microturbine arranged as in FIG. 8, 9 with a sun tracking means 2 axis steering 54, 55 incorporating a vertical rotatable axis retention pole 56 and have tilting 55 means axis 68. Furthermore another version as in FIG. 1 depicts a solar concentrator 30 mounted to the frame 24 and a central support 52 FIG. 2 retains the solar receiver 80 to the solar collector 30 common frame and the remaining components microturbine engine body 29 or 50, radiator system 25/35 and heat exchanger 27 retained aft side of the dish/reflector 30.

Figure 11:
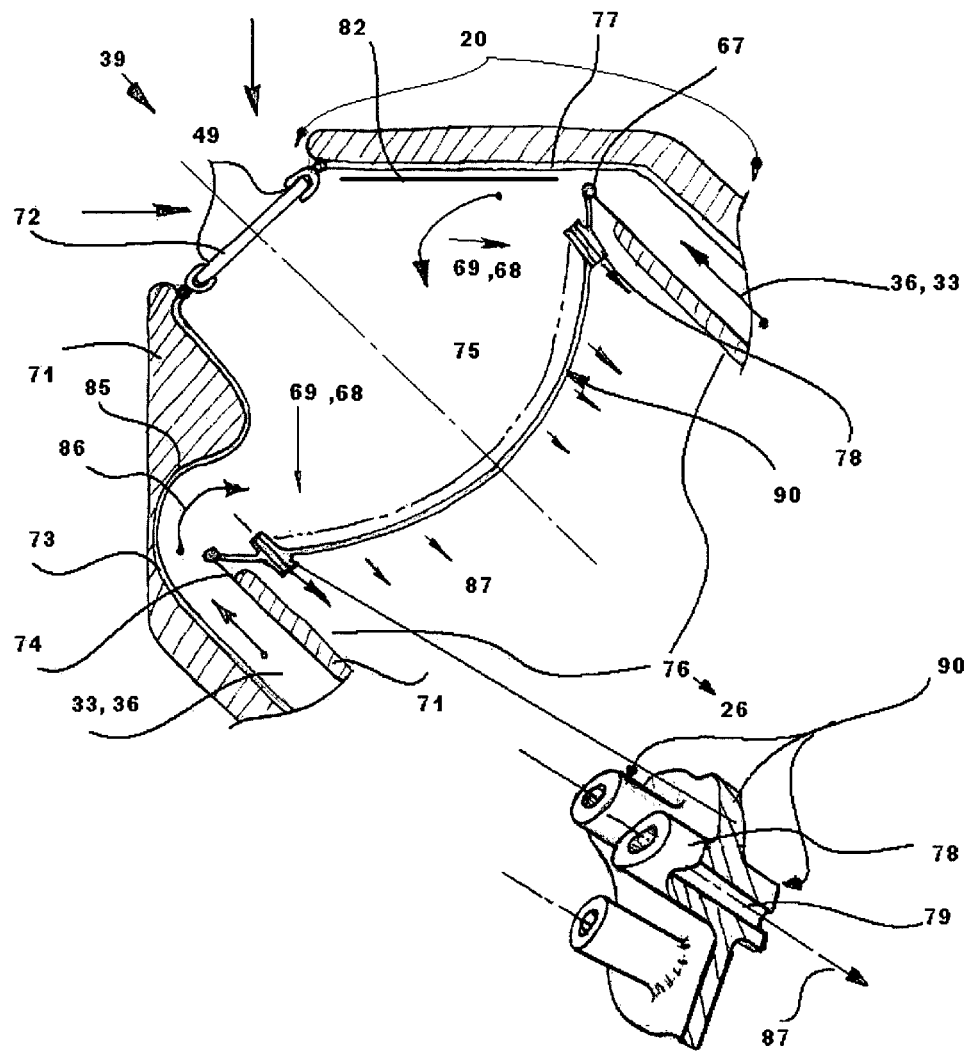
FIG. 11 is a cross sect. view of the Solar Receiver with sealed window.

The Solar Receiver absorbs the concentrated sun ray solar heat energy from the Solar Concentrator and transfers it to a microturbine engine having sealed cycle gas working fluid. The solar Receiver 20 FIG. 11 is made of high temperature capable alloy or non metallic, receives the concentrated solar ray heat energy 39 thru a sealed quartz type window 72 aperture 49 supported thru 77 housing walls; the concentrated sun ray 69 energy having internal light reflection means 82 for further heat concentration onto the medium 90. Fluid flow 36, 33 into cavity 75 being of pressurized engine cycle working fluid with exiting flow 87 thru medium 90 extracting heat from 69 ray heated elements 78 yielding heated gas 79 passing into the duct 26 FIGS. 3 and 7, then into the microturbine body 29 FIGS. 7 and 6 as the working fluid medium to drive the turbine rotor 14 of spool 70 driving the integral alternator rotor 84 yielding output electrical from the stator 47 having electrical wire and an output power leads 15 with seal 53 is connected to the power electronics 31. The solar receiver 20 is modular mounted 60 per FIG. 7 to a the solar dish engine body 29 FIGS. 7 and 6 as working fluid from channeled flow 33, having inner wall 74 and outer wall 73 and into forward pressurized chamber 75. Concentrated Solar ray 39 pass thru a sealed quartz (or equivalent transparent material) medium window heating the high temperature material wall having standoffs 78 material configuration. As the working fluid passes 79 (due to differential pressure in the engine cycle and pressure Ratio and duct flow) and across the wall 90 via the stand off 78 (round form ease of mfr, but could be of other configuration) concentrated medium, it is heated and channeled thru 79 and into 26 duct and to the turbine 14 rotor spool 70 of the solar engine driving the spool 70 and alternator rotor 84. Other medium for solar ray heating could be utilized like foil or porous centered material, but run the risk of becoming loose particles and being ingested into the turbine with subsequent FOD. This approach provides greater heat transfer means than the conventional heat exchangers that utilize conduction through a wall.

Figure 13:
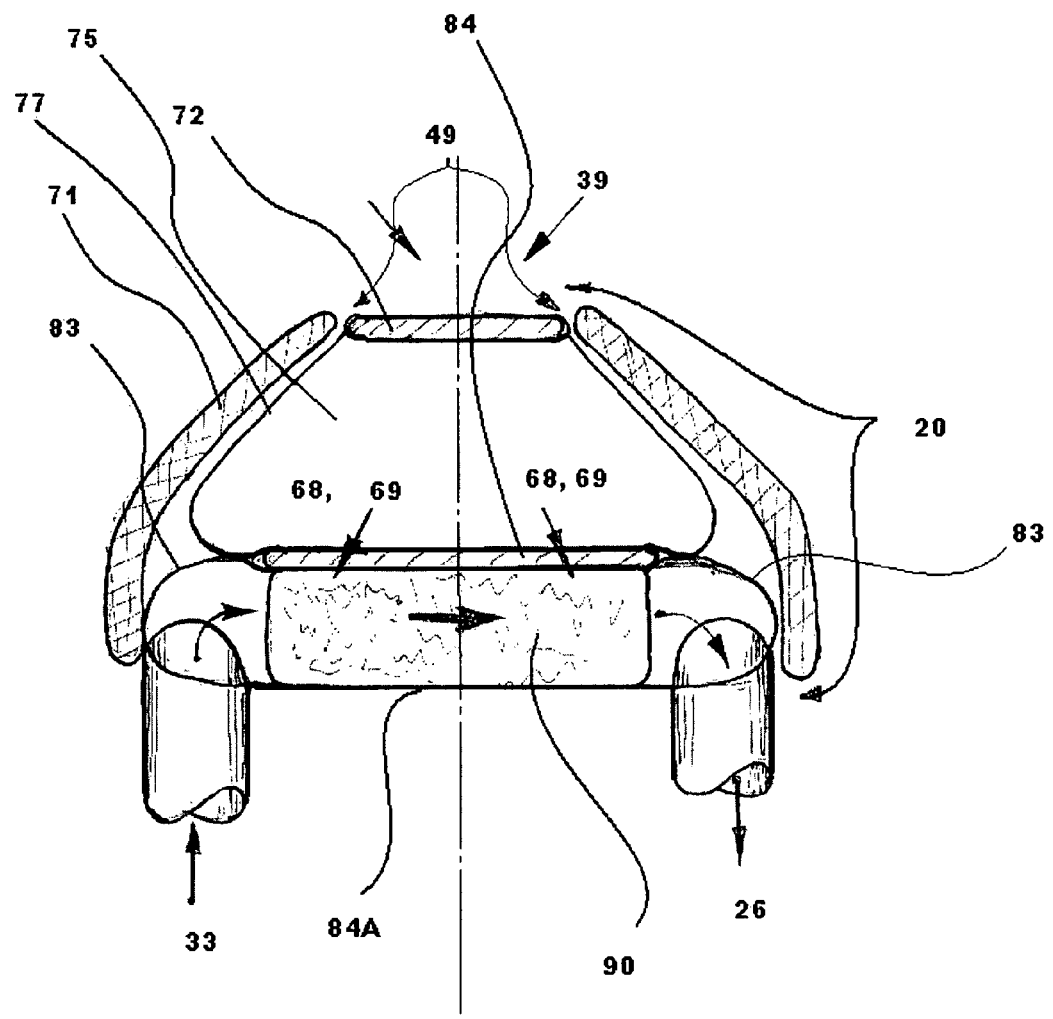
FIG. 13 is a cross sect. view of a Solar Receiver sealed window and window flow wall.

The Solar Receiver 20 is integrated to the solar engine 70 creating module 60 with a retention structure 34 attached (or multiple attachments) to frame 24 or to the solar dish 30. The Brayton cycle because of a lower operational pressure than a Stirling engine system, lends to an easier means to seal the quartz window assembly 72. An insulation means 71 aids in retaining system heat. The pressurized cavity 75 having a cap 77 could incorporate reflective material 82 to assist in heat retention and or further concentration on light onto the heat absorbing medium 90. The heated medium 90 with thru stud 78 hole 79 standoffs prefer dished in concave shape, round for pressure, thermals and light energy absorption consideration but could be rectangular and flat. Working fluid supply to cavity 75 is shown as annular but could be of other configurations as a single one sided entry. The Solar Receiver could have other material heat absorption type configurations (replacing the 90-78 concept) such as honeycomb, tubular assembly, porous media structure (metal or 10 ceramic). The sealed quartz window could be as full width of medium without an aperture size and object 90-78 to be heated. FIG. 13 represents a medium 90 where light energy 39 passes thru a sealed aperture 49 of transparent material into cavity 77 where the light energy 69 passes again thru an internal transparent high temperature material form 84 that does not need to be sealed, is a wall form to effectively channel the differential pressure supplied gas flow 33 thru the light energy 69 heated medium 90 for a heating means exiting into duct 26 to be delivered to the turbine rotor to drive the spool for electrical power generation. The sealed transparent material, typically quartz, has aperture 49 and is supported by a sealed structure 77 retaining the system cycle pressurized gas working fluid could have reflective means integrated for light concentration back onto the medium 90 having inner wall form 84A and transparent outer wall form 84 to accept the light heat energy 69 heating the closed cycle working fluid via. medium 90 as it passes thru and into exiting cavity form 83 and exiting thru 26 passing the hot cycle fluid to the turbine rotor driving the spool 70. Insulation 71 is typical to retain the heat energy about the entire solar receiver form 20.

Figure 12:
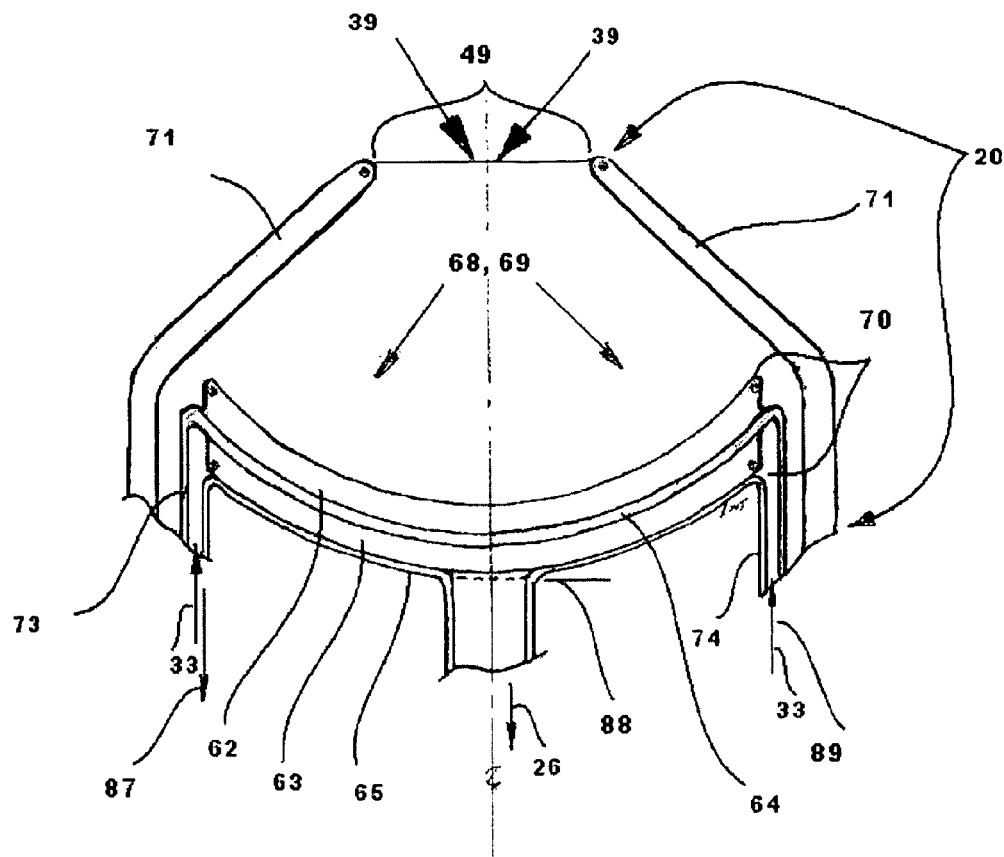
FIG. 12 is a cross sect. view of the Solar Receiver with non sealed window.

FIG. 12 a more conventional heat exchanger where heat transfer across a separating wall 64 similarly integrated into the solar engine nodule 60 of FIG. 7 where a material of the concentrated solar heat energy receiving side of the solar receiver is heated by solar ray 68 or without aperture 69 on fins 62, FIG. 12 then thru conduction transfers heat thru walls 64 to the other side fins 63 hating the gas cycle medium via fins with fluid flow 33 peripheral duct feed having was 73 and 74 travel inward to the exit central area duct 26 and on to the turbine rotor. Also in FIG. 12 configuration with center port exit blocked 88 the cycle gas supply 89 to the heat exchanger having a wall 64 and heating fins 62 the working fluid passes across the finned surface 63 to exit area 87 and with the heat it enters duct 26 to drive the turbine thus removing the quartz sealed window assay. 72 requirement. The solar receiver 20 with the solar engine 70 as a module 60 can be a peripheral structural 34 mounted FIGS. 9 and 6 to the solar concentrator 30 and or frame 24.

Figure 10:
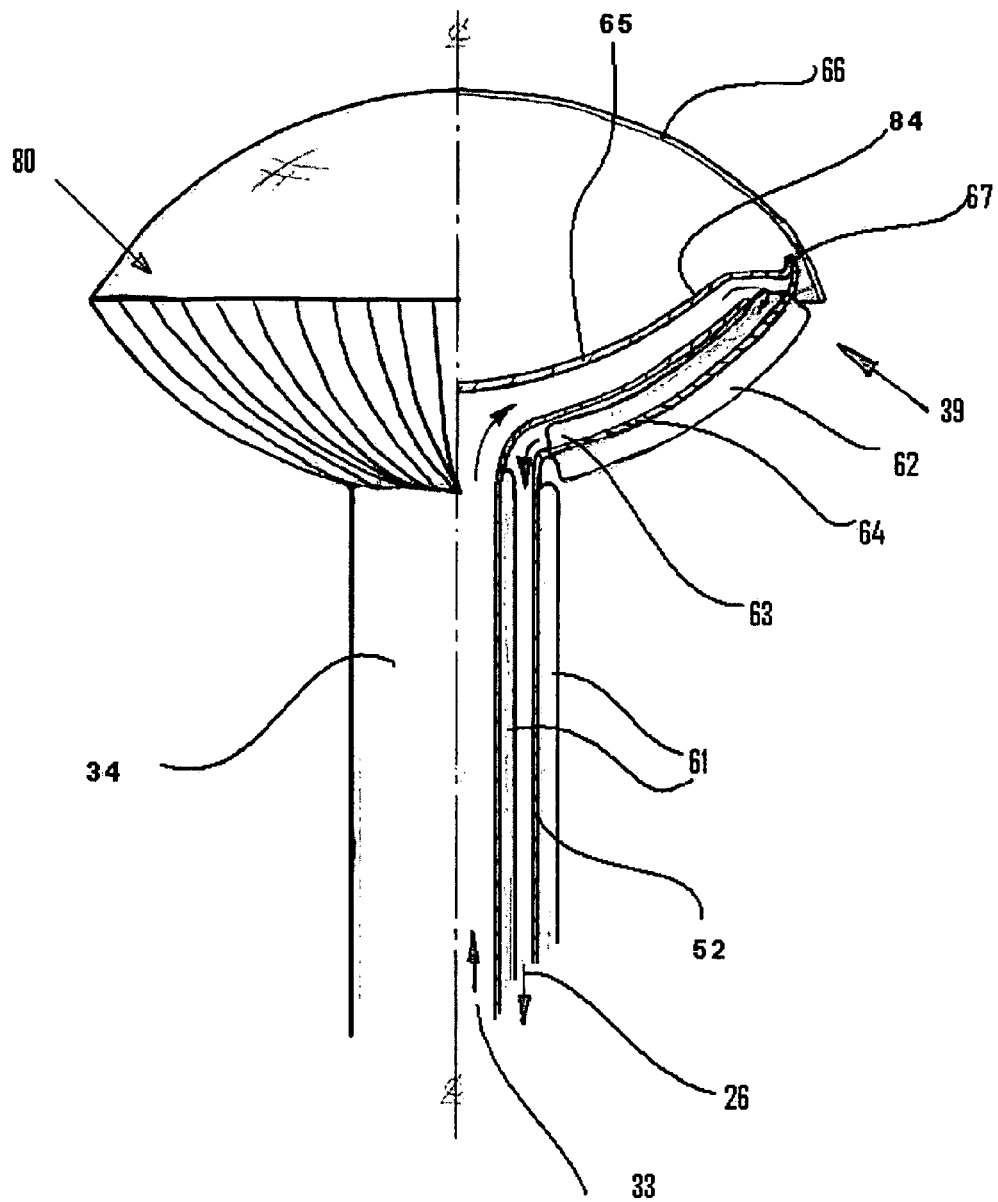
FIG. 10 is a ¼ cross sectional view of a center support finned Solar Receiver.

FIG. 10, the solar receiver 80 non integral to the solar engine can be centrally mounted via insulated 61, structure 52 having heat receiving fins 62 heated by sun rays 39, a gas flow separation wall 64 with cycle gas flow in 33 delivered thru channel having inner walls 74 and outer wall 73 then passing into finned/heat transfer means 63 absorbing heat from 68 heated was 64, fins 62 passes thru via system differential cycle pressure and passes into duct working fluid flow 26 to supply heat to the power turbine rotor 14 of spool 70.

Figure 2:
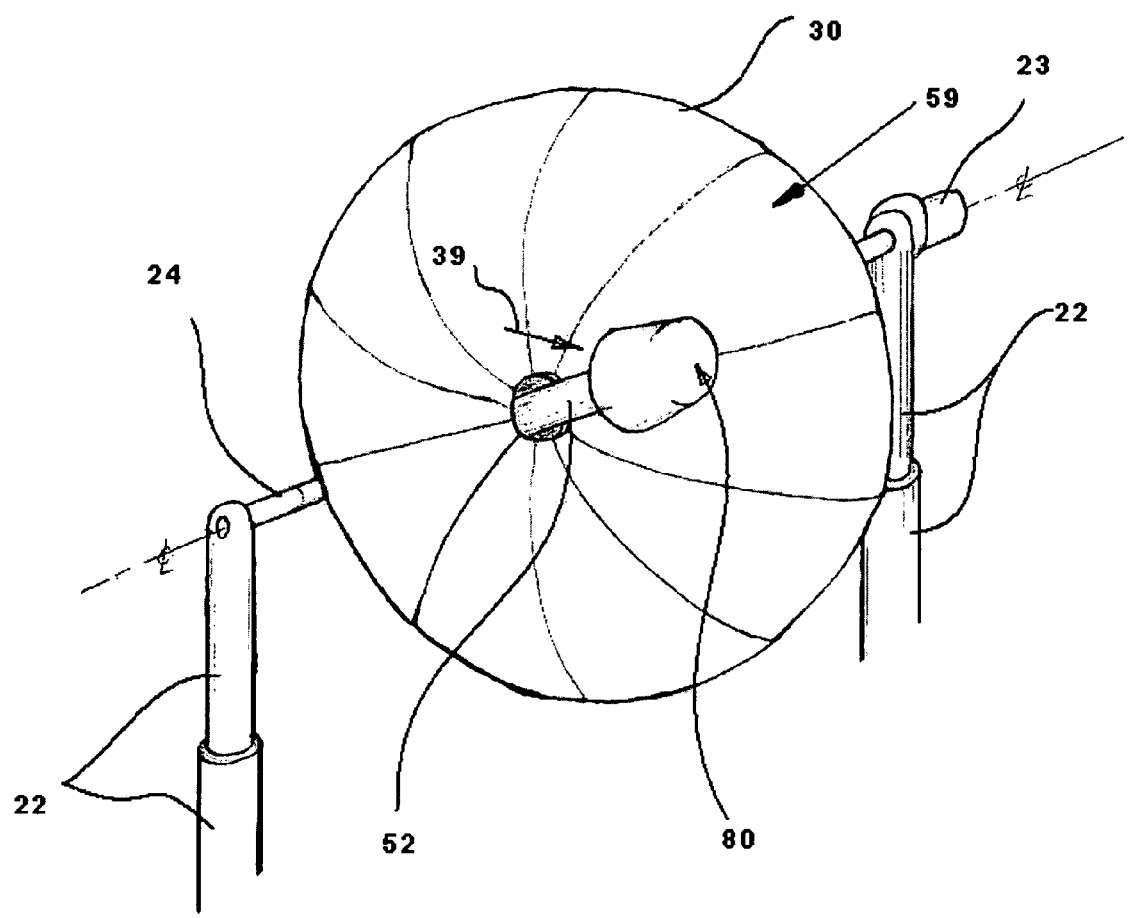
FIG. 2 is an orthogonal view of a deployed Microturbine Sun Tracker.

Still another ref. FIG. 2, the cycle gas 33 channeled 65 with cap 80 is delivered to channel fins 63 having wall 64 to pick up heat flux from fins 62 heat energy 39 concentrated solar rays, and thru a differential cycle pressure in the heat exchanger the heated gas then passes into channel 26 and to the power turbine 14 causing spool 70 rotation and subsequent electrical out power 15 from stator 47 having electrical energy due to relative rotation of the alternator to the stator laminats.

The Microturbine incorporates a closed Brayton cycle, an external heat source, a minimum of one rotatable rotor spool having a compressor rotor, turbine rotor, alternator rotor having retained permanent magnets and a stator having iron base laminat and would electrical wire and within an engine body. The microturbine engine body 29 of FIG. 7 is mounted as in FIG. 6 or FIG. 9 within module 60 in close proximity to the solar concentrator 30; this closed cycle gas turbine engine comprises of an engine body and single output power rotor spool 70 within, has a least one rotatable spool incorporating a compressor bladed rotor 48, a turbine bladed rotor 14, an alternator rotor 84, foil bearing (a well developed air bearing type technology) 16 using compressor discharge gas as hydrodynamic fluid, differential cycle gas flow cooling means, stator heat exchanger 101 of FIG. 8 and an alternator stator 47 in close proximity of the alternator rotor within as the engine body 29 where relative rotation cause electrical energy output thru lead 15, interconnected to wire within stator 47, having engine body seal 53. The microturbine compressor rotor 14 inlet receives the cooled closed system cycle gas from the radiator 25 having external cooling air flow 37-38 with closed cycle gas discharge 44 flow and do to differential closed cycle flow passes thru duct 26. The compressor rotor 48 discharge gas flow 48A passes thru the alternator stator 47 heat exchanger 101 then into duct 36 for further preheat in the heat exchanger 27 (having separate channels within), then ducted 33 to the solar receiver 20 further heated then thru differential cycle pressure, exits the solar receiver 20 having absorbed solar heat energy 39 from heated medium 90 then thru differential cycle pressure, exits the solar receiver 20 channels 79 exiting flow 26A then thru duct 26 to turbine rotor 14 inlet causing turbine rotor 48 integrated to the power spool 70 within engine body 29. The turbine rotor 14 turbine exhaust gas 21 ducted to and thru the separate channeled heat exchanger 27 and then with reduced temperature is ducted 19 to the cooling radiator 25 then to compressor rotor 48 via. inlet supply duct 18.

Figure 3:
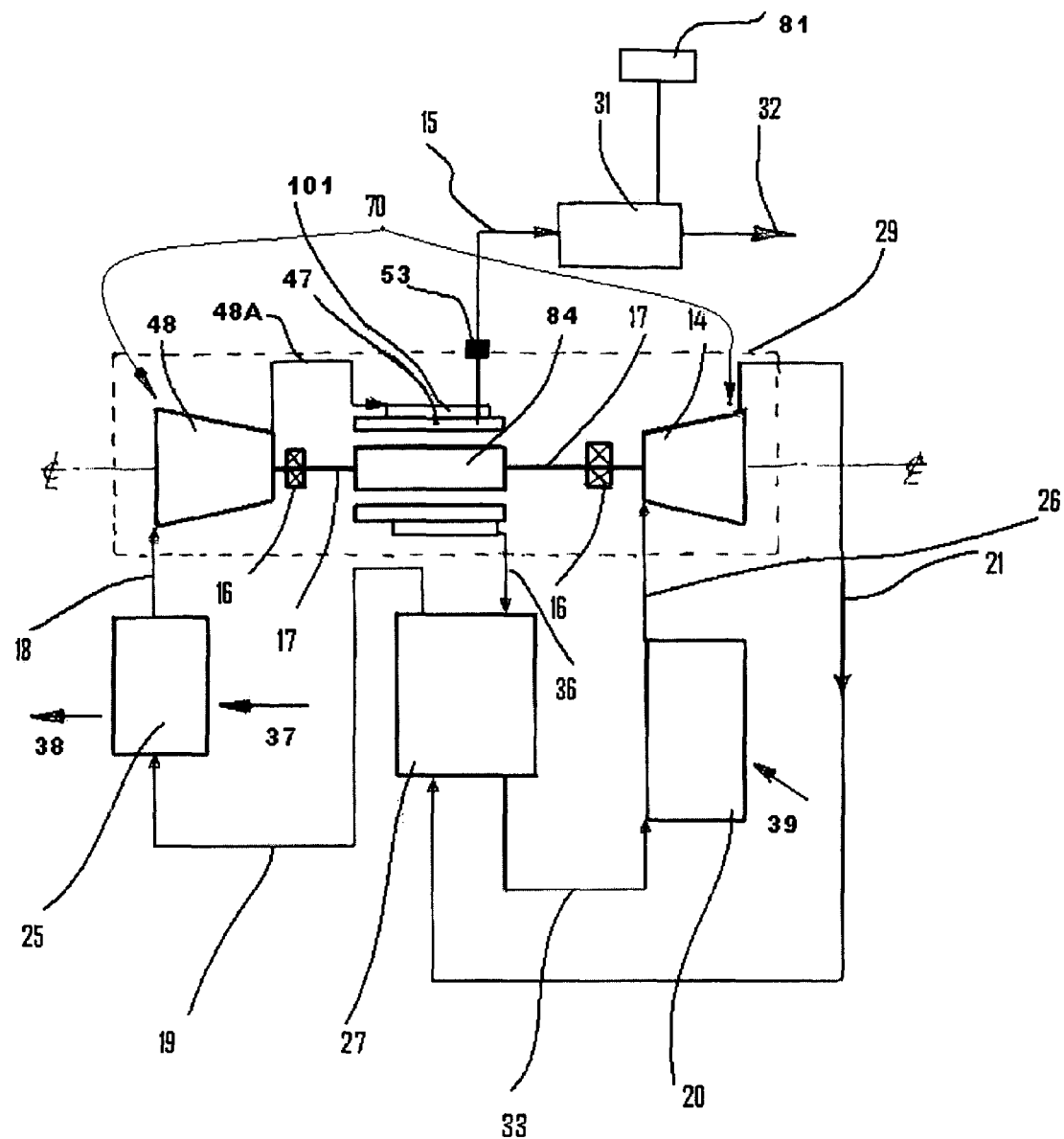
FIG. 3 is a schematic of the Microturbine Sun Tracker.
Figures 8, 9:
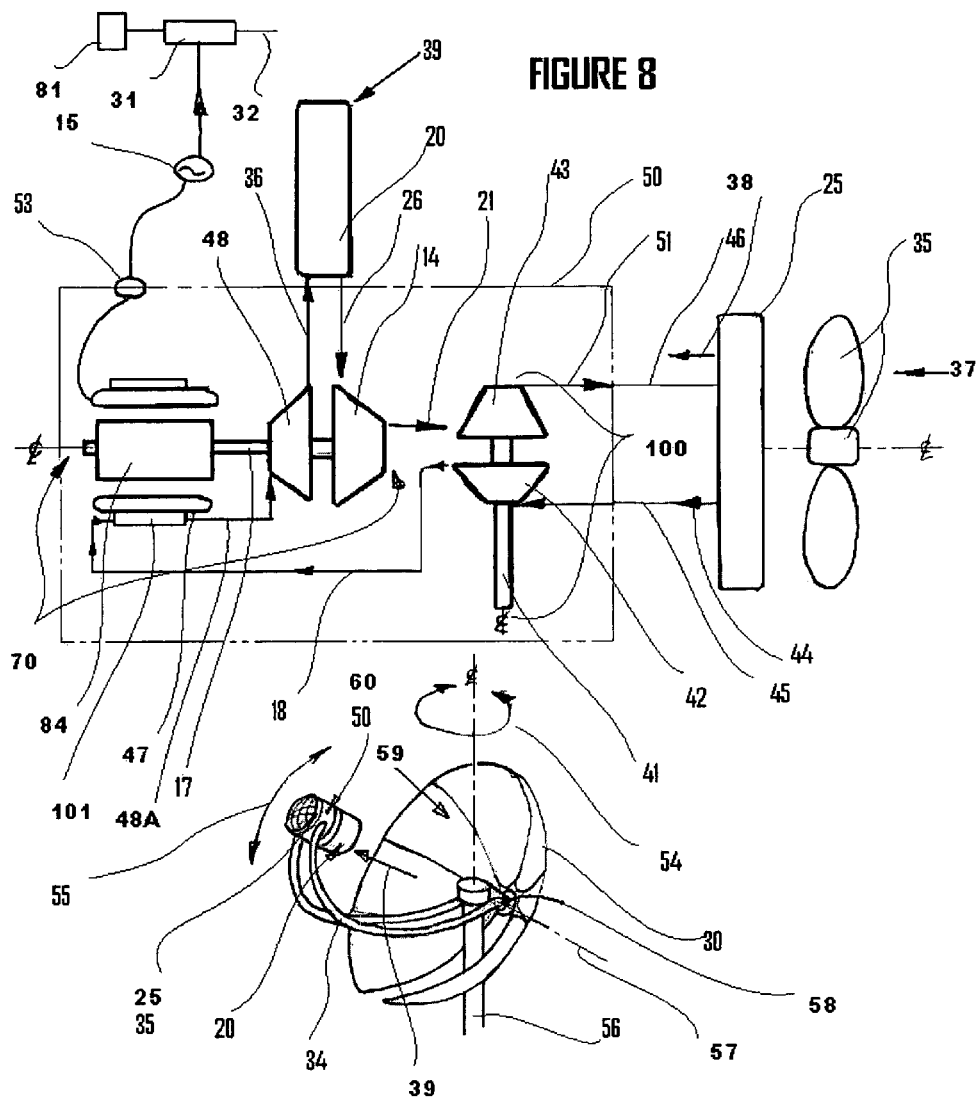
FIG. 8 is a schematic a two spool microturbine dish engine application.
FIG. 9 is an orthogonal view of a vertical axis single side mounted dish engine.

The single spool 70 of microturbine engine body 29 of FIGS. 7 and 3 could be replaced by a 2 spool microturbine within an engine body 50 of FIG. 8 where the brayton cycle system does not require a heat exchanger 27 of FIG. 3, 7 due to a higher pressure system closed cycle. Although a less efficient cycle than the single spool at design max power it could off reduced system weight, size, cost and improved cycle efficiency below ~50% part power. Could be used in systems as noted in FIG. 9, 6, 4, 5 or 1 without exchanger 27. Further review of the 2 spool microturbine FIG. 8, having a the engine body 50 and housed within is a output power spool 70 having a bladed rotor compressor 48, a bladed turbine rotor 14, shaft 17 with foil brgs. (receives gas from the closed cycle with cooling flow considerations) and an alternator rotor 84 having retained permanent magnets and a alternator rotor 84 in close proximity to the alternator stator 47; the second spool (low pressure compressor) 100 consists of a bladed compressor rotor 42, a bladed turbine rotor 43 and a shaft 17 having rotor shaft gas foil bearings. The gas supply to the bearings can be from the compressor discharge of compressor rotor 48 or 42 requiring differential cycle pressures for gas flow by requirements of hydrodynamics and cooling considerations.

In operation, cooled cycle gas from the radiator 25 (having a closed cycle differential pressure to cause flow) is ducted 45 to the rotor low pressure compressor 42 inlet, and thru the compressor rotor 42, with increased fluid gas pressure the exiting compressor rotor gas is ducted 18 to the power spool 70 high pressure compressor rotor 48 inlet, and thru the compressor rotor 42, with increased fluid gas pressure the exiting compressor rotor gas is ducted 18 to the power spool 70 high pressure compressor rotor 48, (this low pressure ratio further increases the over all cycle pressure) the exiting air of the compressor flow is then ducted 48A thru the alternator 47 heat exchanger 101 increasing the cycle gas temperature (could bypass the stator and relay on the fitted engine body to remove the stator heat) and then ducted 36 to the solar receiver 20, within the cycle gas receives concentrated light heat energy 39 via medium 90 structure (or other forms) thru flow 79 into elements of 78, this heated cycle gas energy (absorbing heat of 78) is then enters 26A cavity and on thru the duct 26; to the integrated turbine rotor 14 of the power spool 70 to cause rotation. The exiting turbine gas waste heat energy is duct 21 to the low pressure compressor turbine rotor 43 to drive the low pressure compressor 42 of spool rotor 100, exiting cycle gas 51 from the turbine rotor 43 of spool 100 is then ducted 46 to the radiator assy. 25 (with separate internal flow channels) having fan assy. 35 with separated external cooling air flow 37-38 is gas cycle ducted 44 to the inlet compressor 42 duct. The 2 spool microturbine has an engine body 50 that houses the LP (low pressure compressor) spool 100 and HP (high pressure compressor) or power spool 70. The microturbine single spool or two spool can be remote mounted away from the solar receiver as in FIG. 1 but still be integrated to the frame 24. Also the microturbine module 60 (single or two spool) could be mounted in vertical 2 axis steering system as in FIG. 9; having tilting 55 capability and rotation via 54 secured on a single axis retention pole 56. Although the 2 spool microturbine in FIG. 8 depicts ~90° orientation with respect to each other, for manufacture and or aerodynamics considerations the two spool can be of other angle relationship or parallel the frame axis of rotation.

The Heat Exchanger 27 takes ducted turbine exhaust gas waste heat 27 and preheats the ducted compressor discharge 36 gas (thru separate cavities) before entering the Solar Receiver 20. The Heat Exchanger 27 of FIG. 7 is incorporated in close proximity to the modular mounted 60/single spool microturbine 70 system, it receives compressor Rotor 11 gas waste-alternator stator 12 exit cycle gas flow thru duct 36, gas on one side to this heat exchanger, and is further preheated via the turbine exhaust ducted gas 21 thru a separated flow channel 0 of the hat exchanger, before entering the solar receiver 20. The heat exchanger 27 could be remote mounted as in FIG. 1 separated from the solar receiver to preheat the cycle gas before entering the solar receiver.

The Radiator cools the microturbine closed cycle gas/working fluid prior to entering the compressor rotor inlet. The radiator 25 has a fan assy. 35 to pass atmospheric cooling air (could also use a fluid like water or equivalent) over connected radiator fins to reduce the engine closed cycle gas before entering the compressor rotor 48 inlet. The microturbine closed cycle gas is supplied to the radiator via duct 19 from the heat exchanger 27. The radiator 35 could be non modular remote mounted as in FIG. 1. The cooling means could be a liquid in place to air or some industrial gas. Other means to cause cooling air flow thru the radiator could be in place of the fan assy.

The Horizontal Frame 24 is capable of 360 degree rotation, retains the Solar Receiver 20, Microturbine 50 or 29, Radiator 25, Solar Concentrator 30, Heat Exchanger and Declination poles 22 polar axis tilting capability. The horizontal frame 24 retains the microturbine module 60, the solar concentrator 30 and solar receiver 20 creating a solar dish engine system with module 60 having a structural retention means 34 (can have multiple pt. connections) to the frame or solar dish 30 and has the capability of 360° rotation with bearings mounted outboard areas interconnected to the declination poles 22. The frame has upwardly and downwardly end tiling capability either thru on of both ends, connected to the declination pole. The horizontal frame 24 can be of various forms and could accept a Stirling engine in place of the microturbine module 60.

Figures 4, 5:
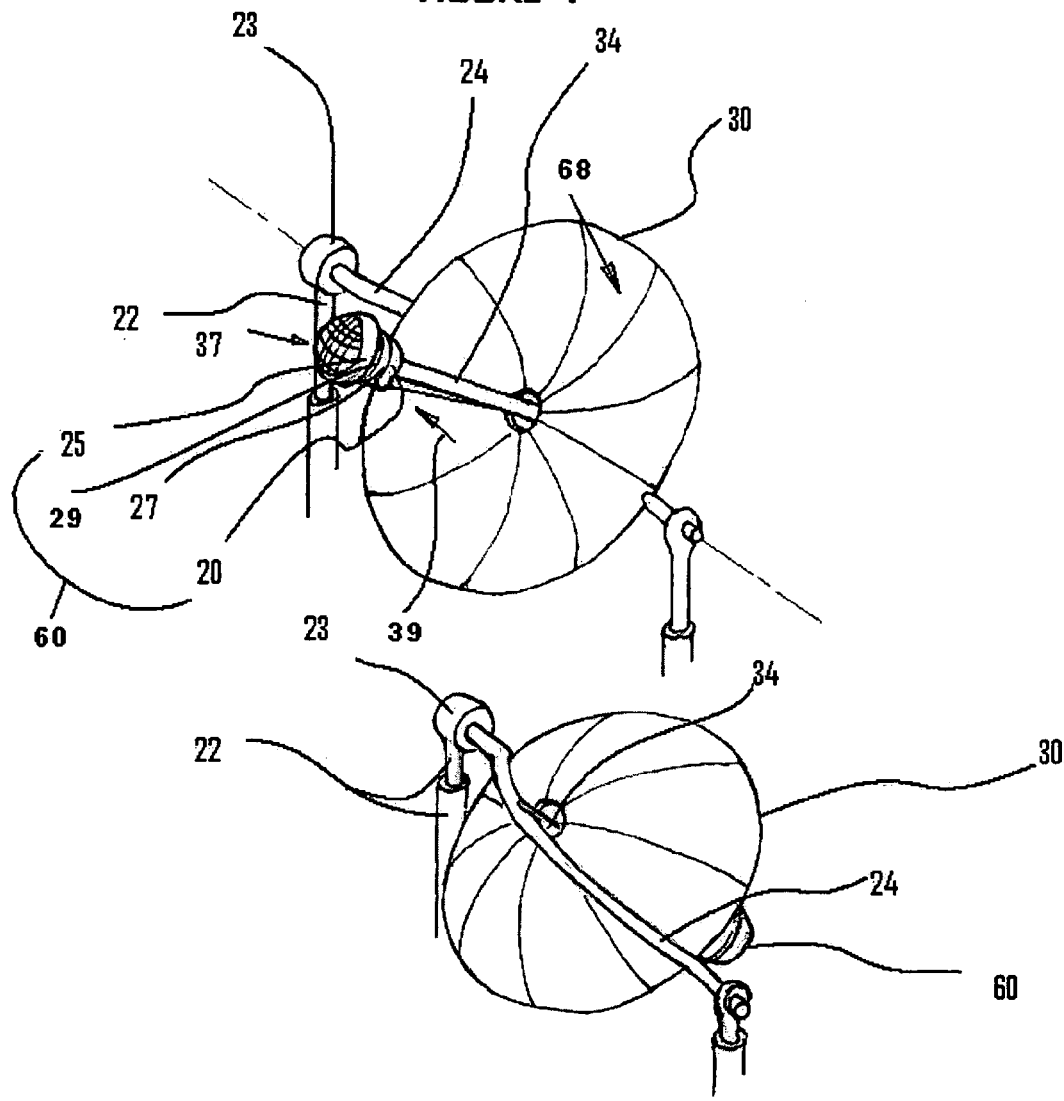
FIG. 4 is an orthogonal view of a MST center supported dish engine deployed.
FIG. 5 is an orthogonal view of MST center supported dish engine retracted.

The microturbine module 60 could be aft fitted tot the solar receiver module 80 of FIG. 10 in place of the cap 66 and accept the heated fluids, 26 outwardly thru the heat exchanger wall 64 with fins 62 and 63 and duct 26 supply to the engine module, leaving a central support means 34 of FIGS. 4 and 5.

Declination Poles are frame end mounted with swivel interface bearings and are used to Earth Pole axis tilt/orient the horizontal frame for optimizing solar energy to the system. The declination poles 22 are extendable/retractable having tilt-able bearings integrated to allow frame 24 to tilt and as a system retains the frame to the ground or building. The upward and downward movement could be electro-mechanical, hydraulic and or simple manual mechanical positioning means. Could be synchronous to the frame rotation or periodic, the latter of which could have a preset position setting by hand to a designed level on a per month or week basis. One or two poles could be fixed with no upward or downward position capability. The pole could have upward and downward position capability thru a non vertical pole. The frame 24 ends could be bearing cradle mounted to another frame and intern could be positioned causing the frame 24 to tilt and structurally be retained to ground or roof top area.

The Frame Rotator is a device that is directly or indirectly connected to at least one end of the Horizontal Frame to cause rotation of the frame for tracking the sun paralleling the earth's axis. The frame rotator 23 is retained to the declination pole 22 or frame to cause frame rotation. It can be associated with a moveable (upward or downward capable) or fixed end position pole. Can be actuated via electro-mechanical motor, hydraulic or linkage means to track the sun paralleling the earth's rotation. The frame rotator could be retained to the frame and cause relative motion to the end ground retention means.

The Electronic Control receives electronic and mechanical position from the solar engine, dish position sensors, controls engine speed, dish position, power output, engine start and shut down. The electronic control interfaces with the solar dish engine sensors, frame positioning sensors engine power electronics and non grid electrical stored electrical energy or grid connected electrical energy. The electronic control 81 interconnected to the power electronics 31, sends programmed electrical operational signals to position the solar engine frame rotation for sun tracking and declination tilt periodic positioning requirements to the electro-mechanical declination pole sensing sun light ray/heat energy for engine operation will spin rotate the rotor power spool using the alternator rotor/stator as an engine starting means up to self sustaining engine spool speed, switch to engine output electrical power mode and regulate the rotor speed/power output for the customer and send electrical energy excess to the grid or storing means, Also at off weather conditions or night phase will position the solar dish engine to a protective position or time opposition for the sunrise initial engine start up. The electronic control 31 could be used to signal power rotate the frame leaving the frame tilting requirement to a periodic manual position thru one or both of the declination poles end attachments. If non grid tie application, the power electronics could use DC battery storage energy source.

The Power Electronics converts high frequency high AC voltage from the engine alternator and converts to DC volts then to useful output volts and frequency; also directs voltage to rotate the power spool. The Electronic Control 31 of FIG. 3 receives from the microturbine electrical output from the power leads 15, non synchronous or synchronous high frequency AC volts and converts it to DC volts and the usable AC volts and frequency. In some case usable output DC volts. It is mounted to the frame or remount to the solar dish engine. It also incorporates a supplemental electrical power means to deliver electrical energy for engine start up means either thru stored energy or grid connection.

The invention is a solar dish engine FIG. 6 incorporating a closed cycle microturbine solar engine module 60 to convert the concentrated solar ray energy 39 from the solar collector 30, with received heat energy to heat the engine working gas via the solar receiver 20 receiving the concentrated solar rays 39, heating the working cycle fluid of the microturbine to drive the power turbine rotor 14 of the integrated power spool 70.

The microturbine module is a close cycle package with the radiator having means of external air flow to cool the cycle gas entering the compressor rotor inlet, the heat exchanger preheats the compressor discharge gas thru separate channeled turbine exhaust gas before passing into the solar receiver where the gas is further heated and then ducted to drive the turbine rot of the power spool. As a module solar engine package the microturbine module-radiator-heat exchanger-solar receiver is position based on absorbing the concentrated solar rays and is retained to the frame via a structure mount 34 outward of the engine module. The system as a package is retained to the frame and all rotate parallel to the earth's rotational axis to track the sun with frame tilted at times to match the earth's polar axis tilt. The electrical output from the engine spool alternator stator wire connects to the power electronics for useful output electrical power and the excess can thru grid connect be supplied to the power utility; excess electrical energy could also be stored thru various means, The solar receiver system of FIG. 11 is a sealed chamber that solar rays heats the microturbine channeled 33, 36 cycle fluid. A two spool microturbine FIG. 8 could be incorporated in place of the single spool microturbine FIG. 3 removing the need of the heat exchanger 27 (as a cost reduction) simplifying the solar dish engine. The engine module with solar receiver could be central support mounted as in FIGS. 3 and 5. As a further means of solar dish engine configuration, the microturbine module with the solar receiver could be mounted in a 2 axis vertically rotatable 54 single support 56 system FIG. 9 with a simultaneous tilting capability 56 axis 58. Furthermore FIGS. 1 and 2 reflect a solar dish system with the solar receiver separate from the engine module having a support 52 heat transfer duct connected to the frame 24 and separate component radiator 25 heat chamber 28 and microturbine 29 are inter-duct-connected attached to the back side to the frame and solar concentrator dish.

This novel invention the Microturbine Sun Tracker is a solar Dish Engine that incorporates a Concentrated Solar Energy (CSE) dish 30 FIG. 6 to concentrate and reflect the sun ray energy onto/into the Solar Receiver 2, where the external concentrated sun ray heat energy is transferred to the Brayton cycle working fluid of the Microturbine engine to drive the turbine rotor 14 of the integrated s power spool 70 having bearings 16, a compressor rotor 48 and an alternator rotor 84—within an engine body 29. The alternator stator 47 with wire connected output lead 15 sealed 53 within the sealed engine body 29, is positioned coaxial to and in close proximity of the alternator rotor 84 where relative rotor rotation yield output electrical power thru the leads 15 and into the power electronics 31 for useful output electricity 31. The integrated Solar Concentrator 30 FIG. 6, Solar Receiver 20, Microturbine module 60 having an engine body 29—interconnected Radiator 25 with cooling fan assy. 35—Heat Exchanger 27—having a securing means 34 are retained to the rotatable frame.

The engine electrical output power generation thru lead wire 15 begins with having sufficient solar rays 59 (with the preposition rotated frame) onto the solar concentrator 30 having a sun tracking means via system censored info electrically relayed to the controller 81 (having supplemental electrical power via stored energy, PV electricity or grid energy) which intern controls the position of the frame 24 via 23 frame rotator the rotation means with axis 57 and frame tilting means thru at least on end connection structure 22 Declination Pokes to yield upward and downward with resultant tiling 91 that can be simultaneous with rotation 57 or periodic positioned.

The Solar concentrator positioning and system initial needs can be from stored energy (battery, pneumatic etc) or electricity from the grid or PV connected means for electronic control 81 to deliver energy to the frame rotator 23. After a period of time the solar 59 concentrated light 39 energy thru the sealed window 72 into the solar receiver 20 cavity seal pressurized 75 heat light-ray energy 69 heats the medium 90, having a porous wall, standoffs 78 means to absorb the light energy and thru cavity channels 79 having resultant heating of the medium 90, a heat sensor means for the medium area signals the electronic control 81 (having supplemental electrical power) allows the power electronics 31 a electric power supply flow thru lead wire 15 to the alternator stator 47 having wires about laminat coaxial to the alternator rotor—to cause alternator rotor 84 to rotate integrated rotor spool 70. Once rotor spool 70, within the engine body 29, reaches a predetermined self rotational speed having sun ray heat energy into the closed engine closed cycle gas, the controller 81 switches to a electrical power out mode where the electrical energy from the alternator rotor-stator now delivers electrical power out thru wire leads 15 and into the power electronics 31 to the end user output lead 32. The rotation of the compressor rotor 48 having rotor blades of the spool rotor 70 creates a engine cycle pressure for the Brayton cycle. The pressurized cycle fluid within cavity 75 due to a cycle pressure flow delta pressure across the medium 90 the fluid flows 79 thru the medium absorbing the light heat energy from the medium elements 78 with an exiting flow 87 into a collection chamber 76; with continued cycle system delta pressure the flow of chamber 76 is channeled into and thru ducting 26 to the turbine rotor 14, causing power spool 70 rotation and integrated alternator rotor 84 within the stator 47 having relative rotation yields subsequent electrical power output thru lead 15. The turbine exit flow 21 is ducted into the heat exchanger 27, having separate gas flow channels the temperature of the is reduced and with the cycle differential pressure, the heat exchanger 27 exiting flow 19 ducts the cycle fluid into the radiator 25 where external separated channeled air flow 37 to 38 from a fan assembly 35 or other means of fluid further cools the cycle fluid gas before entering duct 18 delivery to the compressor rotor 48 intake. The fluid flow is further pressurized thru the compressor rotor, leaving the compressor stage exit cycle gas flow 48A, with some gas passes thru the rotor brgs. 16 fluid hydrodynamic requirements and then thru the stator 47, heat exchanger 101 as a cooling means-heating the cycle fluid, exiting 36 the gas flow is ducted into the separate channeled flow heat exchanger 27 where compressor exiting gas is further heated from turbine exhaust waste heat from duct 21 supply to the heat exchanger 27. The compressor exit gas flow leaves the heat exchanger 27 due to differential cycle system pressures, is ducted 33 into the Solar Receiver 20 and enters again into cavity 75 to be heated via the medium 90 passing thru 79 of cavities 78 of medium 90. The Solar Receiver has cycle gas pressurized system and is part of a closed sealed cycle system, has insulation means 71 and internal reflective means 82 to help concentrate retain the heat energy onto the medium 90. Ideally ducted annular gas flow 33 has inner wall 74 and external walls 73, with flow wall turning means 85 to cause impinging gas flow 86 toward the heated medium 90. Light energy 39 enters 20 sealed window 72 with structure wall 77, having aperture 49 into gas flow cavity 75 with diverging light rays 69 to heat the medium 90 having high temp. capability and ideally with concave form for thermal expansion consideration is retained to structure wall 74 with attachment 67 with minimal gas leakage.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, material, shape, form, function and manner of operation, assembly and use, are deemed readily apparent and obvious to on skilled in the art, and all equivalent relationships to the illustrated in the drawings and described in the specification are intended to be encompassed by the present invention.

Therefore, the foregoing is considered as illustrative only of the principles of the invention, Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed:

1. A solar energy receiver comprising:
a working fluid gas heat absorber;
a cylindrical housing comprising a distal end, a proximal end, a longitudinal centerline, and a working fluid therein, wherein the distal end comprises a working fluid entrance and exit in communication with a heat engine, and wherein the proximal end is a in communication with the concentrated solar light energy;
a concentrated sun light heat energy absorbing porous medium disposed within the proximal end wherein the working fluid passes through the porous medium, wherein the porous medium is located coaxially about and normal to the longitudinal centerline and wherein the working fluid flow parallel to the longitudinal centerline;

a window disposed at the housing proximal end allows solar light heat energy to heat the porous medium through conduction, heating the passing working fluid; and a means to deliver the heated working fluid to the heat engine for electrical power generation and a return to the heat engine exhaust waste heat, wherein the heat exchanged end cycles working fluid back to the solar energy receiver distal end for reheating of the working fluid.

2. A solar energy receiver according to claim 1, wherein the said porous medium is a concave dish having a centerline coaxial to the longitudinal centerline, consisting of multiple extending surface geometries having working fluid flow through channels therein, wherein working fluid is force convection heated.

3. A solar energy receiver according to claim 1, wherein the said porous medium is concave dish having a centerline coaxial to the longitudinal centerline wherein the working fluid passes thru therein and is force convection heated.

4. A solar energy electrical power generation system comprising:
   a) a solar receiver that accepts concentrated sun light for heating a working fluid for a heat engine to generate electrical output power;
   wherein the working fluid is a gas, an inert gas, or an inert gas and gas mixture;
   cylindrical housing comprising a distal end, a proximal end, a longitudinal centerline, and working fluid, wherein the distal end comprises a working fluid entrance and exit in communication with a heat engine and wherein the proximal end is communication with the concentrated solar light energy;
   a concentrated sun light heat energy absorbing porous medium disposed within the proximal end wherein the working fluid passes through the porous medium, wherein the porous medium is located coaxially about and normal to the longitudinal centerline and wherein the working fluid flow parallel to the longitudinal centerline;
   a window disposed at the proximal end allows solar light heat energy to heat the porous medium through conduction, heating the passing working fluid; and
   a means to deliver the heated working fluid to the heat engine for electrical power generation and a return of the heat engine exhaust waste heat, wherein the heat exchanged end cycles working fluid back to the solar energy receiver distal end for reheating of the working fluid;
   b) a solar dish concentrator with solar energy receiver contained therein;
   c) a horizontal frame system, single axis rotatable parallel to the earth's rotational axis, having a proximal end and distal end, retains a solar dish concentrator, a solar receiver and heat engine therein, two frame rotatable bearings in communication with the frame distal and proximal ends and declination pole proximal ends;
   a horizontal frame rotation means to track the earth rotation maximizing the sun energy concentration to the solar receiver;
   at least one declination pole adjustment means for upward or downward frame end movement, polar axis adjustment means;
   d) two declination retention poles each having proximal and distal ends wherein the proximal ends have rotatable bearings, in communication with the proximal and distal frame ends, and the declination pole distal ends are securing means to the ground or retention structure.

5. The solar energy electrical power generation system of claim 4 wherein the frame having single axis earth rotation adjustment has the ability for solar dish downward position vertical declination pole adjustment capability to stow for adverse weather conditions.

6. The solar energy electrical power generation system of claim 4 wherein the declination poles either as a pair or individually are vertically adjustable for the second axis, earth polar optimization means.

7. The solar energy electrical power generation system of claim 4 wherein the heat engine is a closed Brayton cycle two spool Microturbine having an integrated alternator wherein the spools are air bearings that share a common working fluid with the solar receiver.

* * * * *

UNITED STATES PATENT AND TRADEMARK OFFICE
CERTIFICATE OF CORRECTION

| | |
|---|---|
| PATENT NO. | : 8,671,685 B2 |
| APPLICATION NO. | : 12/932627 |
| DATED | : March 18, 2014 |
| INVENTOR(S) | : Joseph Michael Teets et al. |

It is certified that error appears in the above-identified patent and that said Letters Patent is hereby corrected as shown below:

Title page: Item (75) insert second inventor --Jon William Teets, Scottsdale--

Signed and Sealed this
Third Day of June, 2014

Michelle K. Lee
*Deputy Director of the United States Patent and Trademark Office*